(12) United States Patent
Brandon et al.

(10) Patent No.: US 12,269,501 B2
(45) Date of Patent: Apr. 8, 2025

(54) SYSTEMS AND TECHNIQUES FOR MONITORING AND MAINTAINING CLEANLINESS OF AN AUTONOMOUS VEHICLE

(71) Applicant: GM Cruise Holdings, LLC, San Francisco, CA (US)

(72) Inventors: Jeffrey Brandon, Phoenix, AZ (US); Domenico Rusciano, Concord, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 315 days.

(21) Appl. No.: 17/870,691

(22) Filed: Jul. 21, 2022

(65) Prior Publication Data
US 2024/0029486 A1    Jan. 25, 2024

(51) Int. Cl.
*B60W 60/00* (2020.01)
*G06T 7/00* (2017.01)
*G06T 7/70* (2017.01)

(52) U.S. Cl.
CPC ...... *B60W 60/001* (2020.02); *B60W 60/0025* (2020.02); *G06T 7/0004* (2013.01); *G06T 7/70* (2017.01); *B60W 2420/403* (2013.01); *B60W 2420/54* (2013.01); *B60W 2530/00* (2013.01); *B60W 2540/043* (2020.02); *B60W 2540/049* (2020.02); *B60W 2555/20* (2020.02); *G06T 2207/30268* (2013.01)

(58) Field of Classification Search
None
See application file for complete search history.

(56) References Cited

U.S. PATENT DOCUMENTS

| | | | | |
|---|---|---|---|---|
| 11,318,960 | B1 * | 5/2022 | McKnew | G06V 20/59 |
| 2018/0308191 | A1 * | 10/2018 | Matthiesen | G01C 21/3407 |
| 2020/0293799 | A1 * | 9/2020 | Herman | G06V 10/751 |
| 2021/0114614 | A1 * | 4/2021 | Weslosky | G06F 11/0793 |
| 2022/0118952 | A1 * | 4/2022 | Gutowski | B60W 10/30 |
| 2022/0207495 | A1 * | 6/2022 | Derouen | G06Q 10/02 |

* cited by examiner

*Primary Examiner* — Tuan C To
*Assistant Examiner* — David Ruben Pedersen

(57) ABSTRACT

Systems, methods, and computer-readable media are provided for maintaining cleanliness of an autonomous vehicle. In some examples, an autonomous vehicle fleet management device may receive cleanliness data corresponding to at least one autonomous vehicle. In some aspects, the autonomous vehicle fleet management device may determine, based on the cleanliness data, one or more parameters corresponding to at least one cleanliness issue associated with the at least one autonomous vehicle. In some cases, a remediation plan for the at least one cleanliness issue may be determined based on the one or more parameters. In some instances, at least one driving instruction may be sent to the at least one autonomous vehicle that is based on the remediation plan.

8 Claims, 6 Drawing Sheets

SYSTEMS AND TECHNIQUES FOR MONITORING AND MAINTAINING CLEANLINESS OF AN AUTONOMOUS VEHICLE

BACKGROUND

1. Technical Field

The present disclosure generally relates to autonomous vehicles and, more specifically, to monitoring and maintaining cleanliness of autonomous vehicles.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
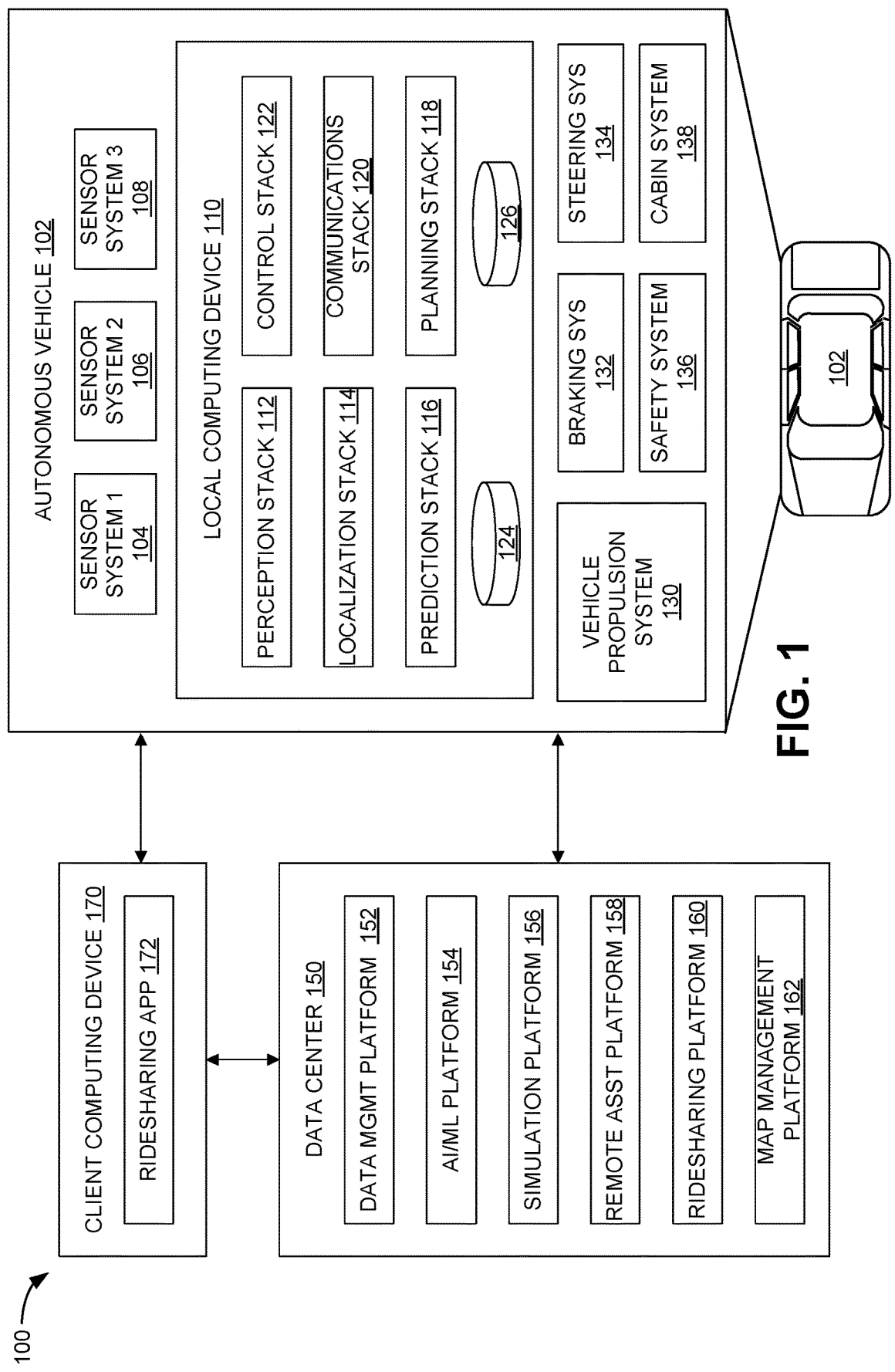
FIG. 1 illustrates an example system environment that can be used to facilitate autonomous vehicle (AV) navigation and routing operations, according to some aspects of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles, also known as self-driving cars, driverless vehicles, and robotic vehicles, are vehicles that use sensors to sense the environment and move without human input. Automation technology in the autonomous vehicles enables the vehicles to drive on roadways and to perceive the vehicle's environment accurately and quickly, including obstacles, signs, and traffic lights. In some cases, the autonomous vehicles can be used to pick up passengers and drive the passengers to selected destinations. In some examples, the autonomous vehicles may be used to transport pets and/or to deliver goods such as groceries and other household items.

Traditionally, a vehicle for hire such as a taxi or an Uber is cleaned based on a schedule or when a human operator determines that the vehicle needs cleaning. In the case of an autonomous vehicle, there is no way to detect a sanitary concern or cleanliness issue that may require attention prior to a next scheduled cleaning. Timely detection of such sanitary or cleanliness issues is important in order to prevent passengers from coming in contact with a possible biohazard and to ensure that passengers are in a safe and clean environment. Moreover, detecting and assessing such sanitary and cleanliness issues is also important in order to direct the autonomous vehicle to an appropriate cleaning or service facility and to apply the correct methodology for cleaning based on the type of issue (e.g., detected substances in the vehicle).

Systems and techniques are provided herein for monitoring and maintaining cleanliness of an autonomous vehicle. In some aspects, sensors located within the autonomous vehicle can be used to collect cleanliness data. In some examples, a passenger may use a wireless device to collect cleanliness data and submit the cleanliness data to a fleet management server. In some embodiments, the cleanliness data can be processed to determine one or more parameters associated with the cleanliness issue. For example, the cleanliness data can be used to determine a type of cleanliness issue (e.g., spill, trash, etc.), a location of a cleanliness issue (e.g., front seat, trunk, etc.), and/or a severity of a cleanliness issue (e.g., low, mid, high).

In some aspects, the parameters associated with a cleanliness issue can be used to determine a remediation plan for the cleanliness issue. In some cases, determining the remediation plan can include identifying an appropriate service facility to clean or repair the autonomous vehicle. In some examples, determining the remediation plan can include identifying a timeframe for performing the service or cleaning. In some instances, determining the remediation plan can include determining a cost for the cleaning and/or repair. In some examples, a fleet management server may direct the autonomous vehicle to an appropriate service facility for cleaning (e.g., based on the remediation plan).

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUS, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML, platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

Figure 2:
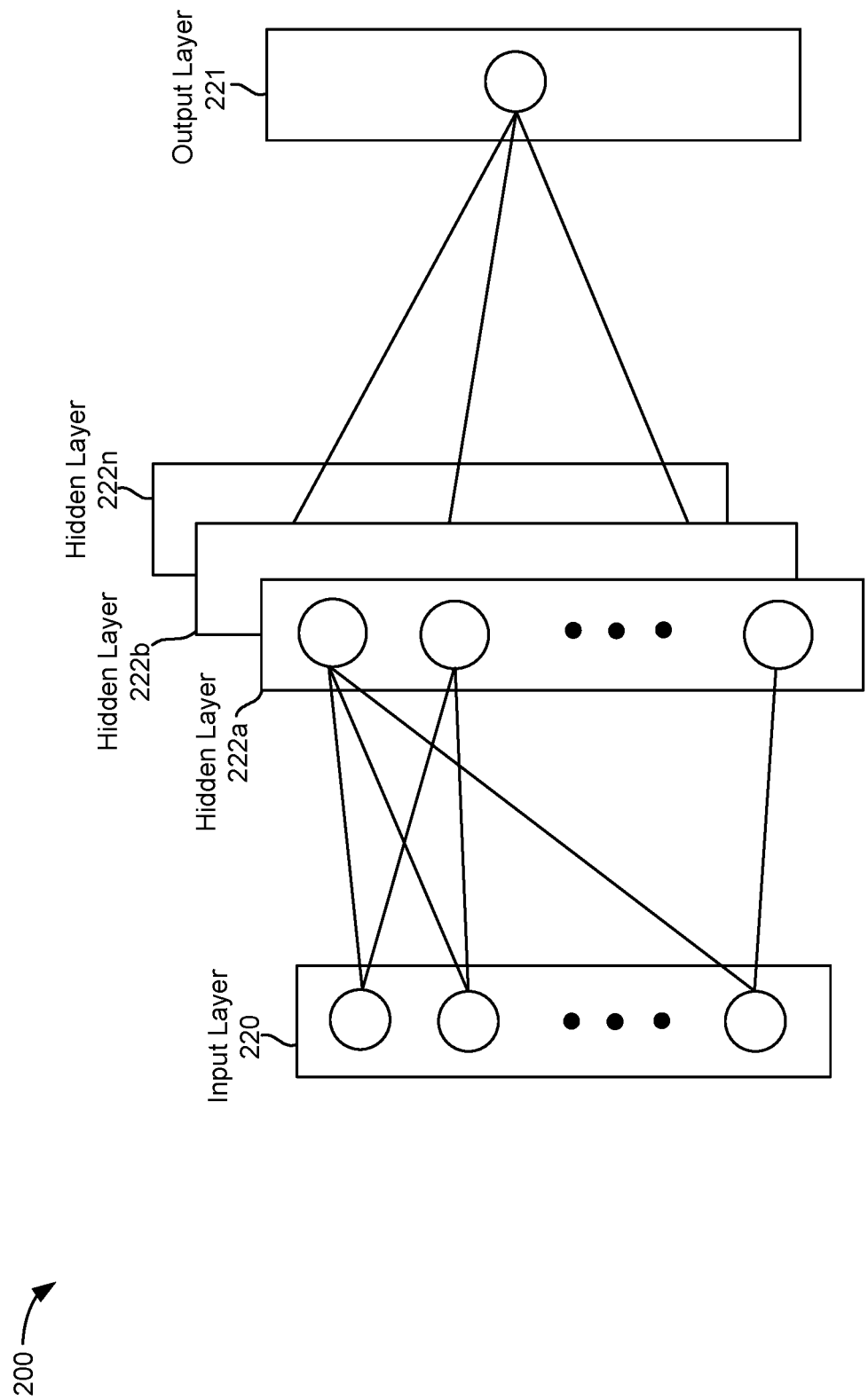
FIG. 2 illustrates an example of a deep learning neural network that can be used to implement monitor and maintain the cleanliness of an autonomous vehicle, according to some aspects of the present disclosure.

In FIG. 2, the disclosure now turns to a further discussion of models that can be used through the environments and techniques described herein. FIG. 2 is an example of a deep learning neural network 200 that can be used to implement all or a portion of the systems and techniques described herein. For example, neural network 200 can be used to implement a perception module (or perception system) as discussed above. In another example, neural network 200 can be used to monitor, maintain, and/or assess cleanliness of an autonomous vehicle (e.g., identify cleanliness issues, identify parameters associated with cleanliness issues, determine remediation plans for cleanliness issues, determine cleaning schedules for autonomous vehicles, determine triggers for requesting cleanliness data associated with an autonomous vehicle, etc.). In some examples, neural network 200 may be implemented at AV 102, data center 150, and/or client computing device 170.

In some examples, an input layer 220 can be configured to receive sensor data and/or data relating to an environment surrounding an AV. The neural network 200 includes multiple hidden layers 222a, 222b, through 222n. The hidden layers 222a, 222b, through 222n include "n" number of hidden layers, where "n" is an integer greater than or equal to one. The number of hidden layers can be made to include as many layers as needed for the given application. The neural network 200 further includes an output layer 221 that provides an output resulting from the processing performed by the hidden layers 222a, 222b, through 222n. In one illustrative example, the output layer 221 can provide estimated treatment parameters, that can be used/ingested by a differential simulator to estimate a patient treatment outcome.

The neural network 200 is a multi-layer neural network of interconnected nodes. Each node can represent a piece of information. Information associated with the nodes is shared among the different layers and each layer retains information as information is processed. In some cases, the neural network 200 can include a feed-forward network, in which case there are no feedback connections where outputs of the network are fed back into itself. In some cases, the neural network 200 can include a recurrent neural network, which can have loops that allow information to be carried across nodes while reading in input.

Information can be exchanged between nodes through node-to-node interconnections between the various layers. Nodes of the input layer 220 can activate a set of nodes in the first hidden layer 222a. For example, as shown, each of the input nodes of the input layer 220 is connected to each of the nodes of the first hidden layer 222a. The nodes of the first hidden layer 222a can transform the information of each input node by applying activation functions to the input node information. The information derived from the transformation can then be passed to and can activate the nodes of the next hidden layer 222b, which can perform their own designated functions. Example functions include convolutional, up-sampling, data transformation, and/or any other suitable functions. The output of the hidden layer 222b can then activate nodes of the next hidden layer, and so on. The output of the last hidden layer 222n can activate one or more nodes of the output layer 221, at which an output is provided. In some cases, while nodes in the neural network 200 are shown as having multiple output lines, a node can have a single output and all lines shown as being output from a node represent the same output value.

In some cases, each node or interconnection between nodes can have a weight that is a set of parameters derived from the training of the neural network 200. Once the neural network 200 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 200 to be adaptive to inputs and able to learn as more and more data is processed.

The neural network 200 is pre-trained to process the features from the data in the input layer 220 using the different hidden layers 222a, 222b, through 222n in order to provide the output through the output layer 221.

In some cases, the neural network 200 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 200 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 200 can perform a backward pass by determining which inputs (weights) most contributed to the loss of the network, and can adjust the weights so that the loss decreases and is eventually minimized.

The neural network 200 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 200 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 3:
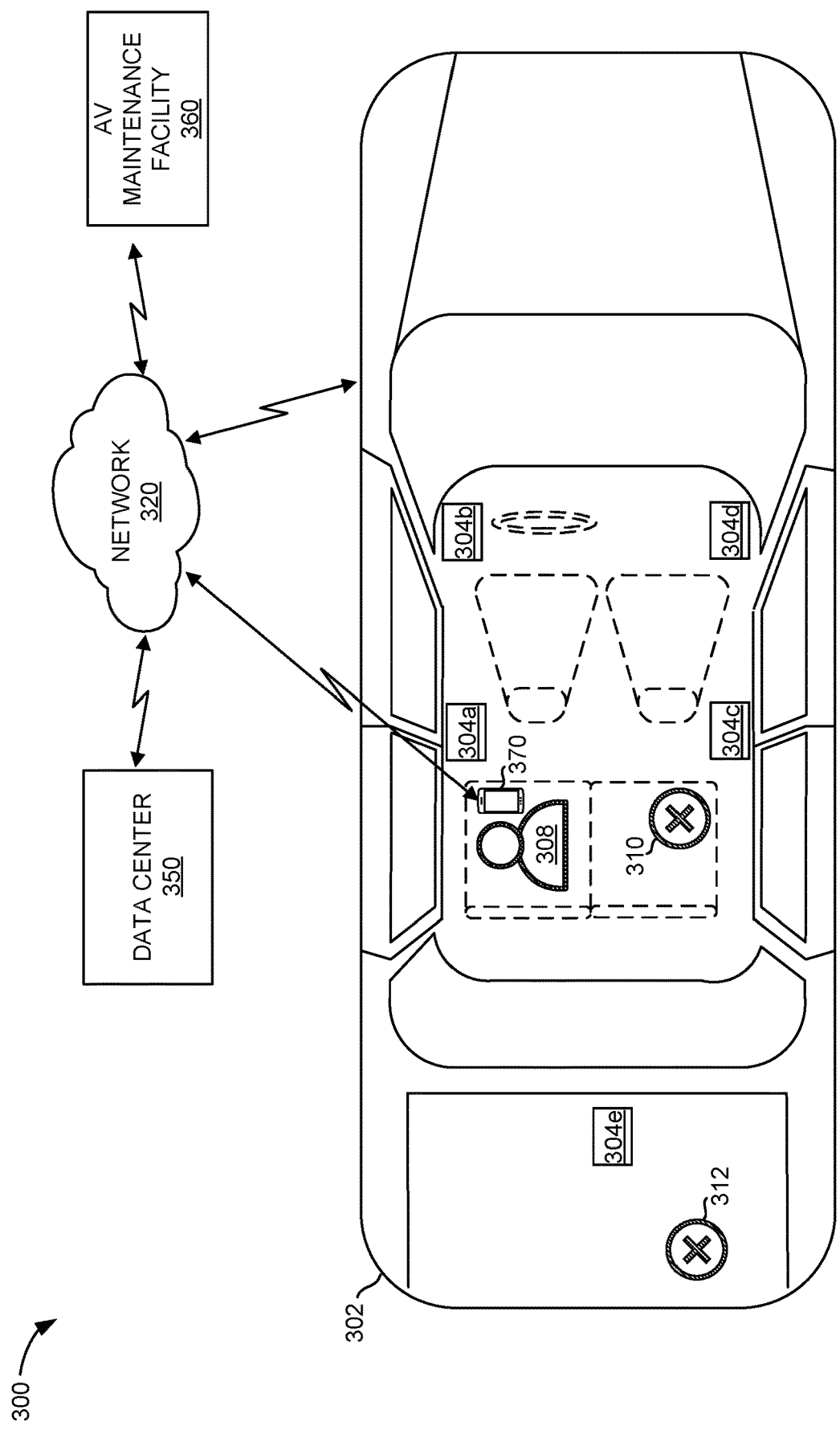
FIG. 3 illustrates an example system for monitoring and maintaining cleanliness of an autonomous vehicle, according to some aspects of the present disclosure.

FIG. 3 illustrates an example of a system 300 that may be configured to monitor cleanliness of an autonomous vehicle (AV). In some aspects, system 300 may include AV 302 (e.g., AV 102 illustrated in FIG. 1). In some cases, AV 302 may include one or more sensors such as sensor 304a, sensor 304b, sensor 304c, sensor 304d, and/or sensor 304e (collectively referred to as "sensors 304"). In some examples, sensors 304 may correspond to sensor systems 104-108 as described in connection with FIG. 1.

In some instances, sensors 304 may capture data that can be used to determine and/or monitor the cleanliness of AV 302. In some cases, sensor 304a, sensor 304b, sensor 304c, and sensor 304d may include cameras (e.g., still image cameras, video cameras, etc.) that can capture images or videos within the main cabin of AV 302. In some aspects, sensor 304e may include a camera that is configured to capture images or videos from inside a storage compartment (e.g., trunk) of AV 302. In some embodiments, sensors 304 may include odor sensors configured to detect malodors within AV 302. In some cases, sensors 304 may include humidity sensors configured to detect the level of humidity within AV 302. Those skilled in the art will recognize that the systems and techniques described herein may be implemented using a different number of sensors 304 as well as different types and/or different positions of sensors 304 (e.g., one or more sensors may be configured to monitor cleanliness of the outside of AV 302).

In some examples, AV 302 may be associated with one or more passengers such as passenger 308. In some cases, passenger 308 may have one or more wireless communication devices such as wireless device 370 (e.g., client computing device 170 illustrated in FIG. 1). In general, wireless device 370 may include any device suitable for communicating over wireless network 320 such as a mobile phone, tablet, laptop computer, smartwatch, smart-glasses, etc. In some instances, wireless device 370 may include one or more sensors (e.g., cameras) that can be used to capture data to determine and/or monitor the cleanliness of AV 302.

In some aspects, sensors 304 and/or wireless device 370 may collect data corresponding to a cleanliness issue associated with AV 302. For example, sensors 304 and/or wireless device 370 may collect data (e.g., image data, video data, malodor data, etc.) associated with cleanliness issue 310 and/or cleanliness issue 312. In some cases, cleanliness issue 310 and/or cleanliness issue 312 may include spills, trash, stains, vomit, blood, malodor, dirt, sand, hair, etc. In some examples, cleanliness issue 310 and/or cleanliness issue 312 may include miscellaneous items such as a purse, wallet, phone, backpack, groceries, etc. For example, cleanliness issue 310 and/or cleanliness issue 312 may correspond to items that may have been left or lost by passengers of AV 302.

In some cases, sensors 304 may collect data to monitor cleanliness of AV 302 periodically. For example, AV 302 may be configured to collect data to assess cleanliness once per hour. In some aspects, AV 302 may receive a request for cleanliness data from data center 350 (e.g., data center 150 illustrated in FIG. 1). In some instances, AV 302 may be configured to collect data (e.g., using sensors 304) to assess cleanliness based on a trigger condition. In some aspects, a trigger condition for collecting cleanliness data can include a passenger pick-up location, a passenger drop-off location, a travel route, a time of day, an elapsed time of service, a cleaning schedule, a threshold number of passengers, a type of goods detected, an animal presence, a ride start, a ride end, a weather condition, any other suitable trigger condition, and/or any combination thereof. In one illustrative example, AV 302 may collect cleanliness data when a drop-off location corresponds to a veterinarian office (e.g., AV 302 and/or data center 350 may infer that an animal was transported). In another example, AV 302 may collect cleanliness data after providing 10 rides. In some aspects, a trigger condition for collecting cleanliness data may be detected by AV 302 and/or by data center 350.

In some embodiments, passenger 308 may use wireless device 370 to collect cleanliness data. For example, passenger 308 may observe cleanliness issue 310 and use wireless device 370 to take pictures and/or videos of cleanliness issue 310. In some cases, passenger 308 may be prompted to collect cleanliness data using wireless device 370. For example, data center 350 can send a request for cleanliness data to wireless device 370 via network 320 based on detection of a trigger condition such as those noted above (e.g., a pick-up location, a drop-off location, a travel route, a time of day, an elapsed time of service, a cleaning schedule, a threshold number of passengers, a type of goods detected, an animal presence, a ride start, a ride end, a weather condition, etc.). In one illustrative example, data center 350 may send a communication to wireless device 370 at the end of a ride requesting that the user rate the cleanliness level of AV 302 and/or provide data (e.g., images, text description, etc.) associated with any cleanliness issues.

In some cases, an application (e.g., ridesharing app 172) operating on wireless device 370 can be configured to receive and/or process cleanliness data captured by wireless device 370. In some examples, the application operating on wireless device 370 can include options or menus that may be used by passenger 308 to identify one or more parameters associated with a cleanliness issue (e.g., cleanliness issue 310 and/or cleanliness issue 312). For example, an application operating on wireless device 370 can be used to identify a type of cleanliness issue (e.g., spill, trash, stain, odor, lost item, etc.); a severity of the cleanliness issue (e.g., mild, mid, high, etc.); and/or a location of the cleanliness issue (e.g., front right seat, left rear seat, trunk, windshield, floor, etc.).

In some cases, passenger 308 may use wireless device 370 to provide text or voice data associated with a cleanliness issue. For example, passenger 308 may provide a written description of cleanliness issue 310 (e.g., "ketchup spilled on rear passenger seat."). In another example, passenger 308 may record a voice note describing cleanliness issue 310. In some instances, passenger 308 may edit visual data captured using wireless device 370. For example, passenger 308 may highlight or circle an area on a photograph corresponding to cleanliness issue 310.

In some examples, wireless device 370 and/or AV 302 may send cleanliness data (and corresponding metadata) to data center 350 via network 320. In some aspects, data center 350 can process cleanliness data to determine one or more parameters associated with a cleanliness issue (e.g., cleanliness issue 310 and/or cleanliness issue 312). For example, data center 350 may process cleanliness data to determine a cleanliness issue type, a cleanliness issue location, a cleanliness issue severity, and/or any combination thereof.

In some cases, data center 350 may determine a cleanliness issue location based on the pose of image data collected by wireless device 370 and/or sensors 304. In some aspects, data center 350 may compare or analyze images of the cleanliness issue using design parameters of AV 302 (e.g., cabin configuration, cabin dimensions, etc.) to increase the precision of the identified cleanliness issue location. In some examples, data center 350 may determine cleanliness issue severity based on factors such as the size of the cleanliness issue, the cleanliness issue location, the cleanliness issue type, etc. For instance, a crayon mark on the backside of a seat within AV 302 may be considered as a low cleanliness issue severity while a soiled diaper left on the floor of AV 302 may be considered as a high cleanliness issue severity.

In some embodiments, data center 350 may determine a remediation plan for the cleanliness issue (e.g., cleanliness issue 310 and/or cleanliness issue 312). In some examples, the remediation plan may include a type of service or cleaning, one or more service providers that can perform the service or cleaning (e.g., cleaning facility, mechanic, etc.), a timetable for implementing the service or cleaning, and/or an estimated cost associated with the service or cleaning. In some aspects, the remediation plan can be based on the cleanliness issue type, cleanliness issue location, cleanliness issue severity, etc. For instance, data center 350 may determine that smudges on windows (e.g., low severity) can be remediated by directing AV 302 to a standard car wash at a future time (e.g., within the next day) based on AV location relative to the car wash. In another example, data center 350 may determine that the remediation plan for a severely soiled seat requires immediate replacement of the seat, and data center 350 may direct AV 302 to discontinue ride service and proceed to an appropriate auto repair facility (e.g., AV maintenance facility 360).

In some cases, data center 350 may send data and or instructions (e.g., via network 320) regarding the remediation plan for the cleanliness issue to AV maintenance facility 360. For example, data center 350 may send image data, audio data, textual data, location data, severity data, etc. that is associated with cleanliness issue 310 to AV maintenance facility 360. In some instances, AV maintenance facility 360 can include any facility that may perform cleaning and/or repairs of AV 302. In some examples, AV maintenance facility 360 may use the data received from data center 350 to determine the service that is to be performed on AV 302. In some cases, AV maintenance facility 360 may send feedback to data center 350 when the service is completed. For example, AV maintenance facility 360 may capture and send photographs of the area corresponding to cleanliness issue 310 after cleaning or repair has been performed. In some instances, data center 350 may review feedback from AV maintenance facility 360 to ensure that cleanliness issue 310 has been resolved. In some examples, data center 350 may determine a revised remediation plan based on feedback received from AV maintenance facility 360. In some instances, the revised remediation plan may require further cleaning and/or maintenance at the same or a different AV maintenance facility 360.

In some examples, data center 350 may process cleanliness data using a machine learning algorithm. For example, data center 350 may implement a deep learning neural network (e.g., neural network 200) that can use cleanliness data to identify parameters such as cleanliness issue type, cleanliness issue location, cleanliness issue severity, etc. In some instances, the neural network can use parameters associated with a cleanliness issue to determine a remediation plan (e.g., type of service/cleaning, service/cleaning facility, schedule for service/cleaning, cost of service/cleaning, etc.). In some aspects, the neural network may also be used to identify and/or tune triggers for requesting cleanliness data from an AV and/or a passenger. In some instances, the neural network may also be used to determine or predict when an AV may require cleaning (e.g., based on time in service, number of passengers, number of rides, location data, weather data, etc.).

In some examples, a neural network may be implemented on AV 302 and/or wireless device 370. In some cases, the neural network on AV 302 and/or wireless device 370 may be alternative or in addition to a neural network implemented using data center 350. For example, AV 302 and/or wireless device 370 may implement a neural network that processes data (e.g., sensor data) to identify cleanliness issue 310 and/or cleanliness issue 312, to determine one or more parameters associated with a cleanliness issue (e.g., cleanliness issue type, cleanliness issue location, cleanliness issue size, cleanliness issue severity, etc.), and/or to determine a remediation plan for a cleanliness issue.

Figure 4:
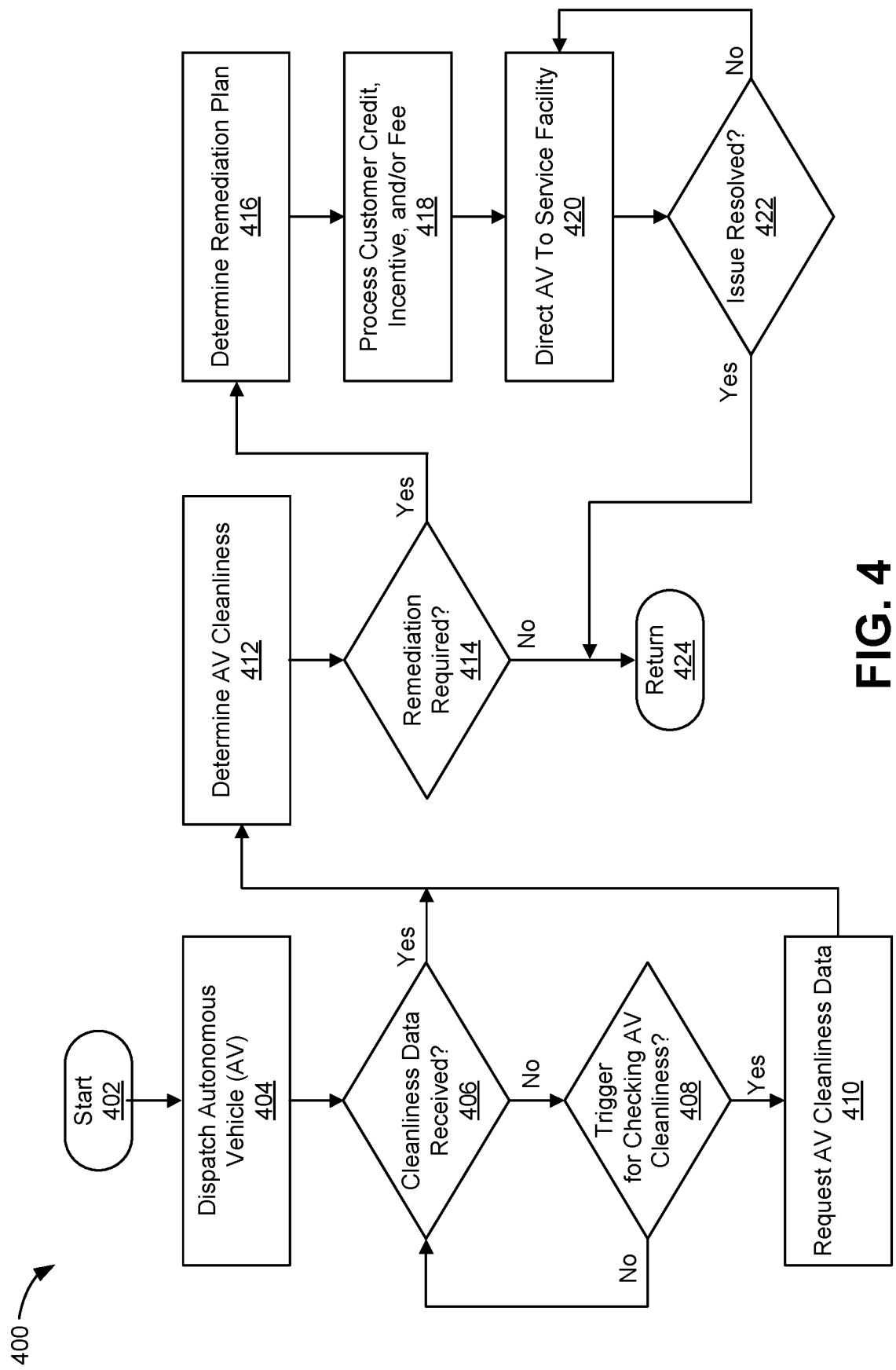
FIG. 4 illustrates an example of a process for monitoring and maintaining cleanliness of an autonomous vehicle, according to some aspects of the present disclosure.

FIG. 4 illustrates an example of a process 400 for monitoring and maintaining cleanliness of an autonomous vehicle. In some examples, process 400 may be performed by an autonomous vehicle (AV) fleet management device or system such as data center 350. In some aspects, process 400 may start at step 402 which may include initializing of hardware and software systems associated with an AV (e.g., AV 302). In some examples, process 400 may include step 404 in which the AV is dispatched. In some cases, dispatching the AV may include placing the AV in service for responding to requests for ridesharing services.

At step 406, the process 400 may include determining whether cleanliness data was received. For example, passenger 308 in AV 302 may upload cleanliness data to data center 350 using wireless device 370. In some aspects, the cleanliness data can include image data (e.g., photo or video), text data, speech data, and/or any other type of suitable data. In another example, AV 302 may upload cleanliness data obtained from sensors 304 to data center 350.

In some aspects, if cleanliness data is not received at step 406, the process 400 may proceed to step 408 to determine whether a trigger for checking AV cleanliness has been detected. In some cases, a trigger for checking AV cleanliness can include a pick-up location, a drop-off location, a travel route, a time of day, an elapsed time of service, a cleaning schedule, a number of passengers, a type of goods, an animal presence, a ride start condition, a ride end condition, a weather condition, and/or any combination thereof.

In some instances, if a trigger is detected, the process 400 can proceed to step 410 to request AV cleanliness data. For example, data center 350 may send a request to AV 302 to collect cleanliness data using sensors 304. In another example, data center 350 may send a request to wireless device 370 for passenger 308 to capture cleanliness data using wireless device 370.

In some aspects, if a trigger is not detected at step 408, the process may return to step 406 and await cleanliness data. In some embodiments, when cleanliness data is received at step 406 or pursuant to a request at step 410, the process 400 may proceed to step 412 to determine AV cleanliness. In some examples, determining AV cleanliness may include processing sensor data (e.g., image data, video data, malodor data, humidity data, text data, voice data, etc.) to determine one or more parameters associated with a cleanliness issue. For example, data center 350 may process AV cleanliness data received from AV 302 and/or from wireless device 370 to determine a cleanliness issue type (e.g., spill, trash, etc.); a cleanliness issue location (e.g., floor, rear right seat, trunk, etc.); and/or a cleanliness issue severity (e.g., low, mid, high).

At step 414, the process may include determining whether remediation of the cleanliness issue is required. For example, remediation may not be required if the cleanliness issue severity is low (e.g., small stain inside trunk). If remediation is not required, the process 400 can proceed to step 424 in which the process returns to prior processing, which may include repeating the process 400. If remediation is required, the process 400 may proceed to determine a remediation plan at step 416. In some aspects, a remediation plan can be based on the parameters (e.g., location, type, severity, etc.) that are associated with the cleanliness issue. In some examples, a remediation plan may identify the type of service required, one or more service providers, estimated cost for the service, schedule for the service, etc.

In some aspects in which the cleanliness issue corresponds to a lost or misplaced item, the remediation plan may include a plan for retrieving and returning the item to the appropriate passenger. For example, data center 350 may use ride history data to determine a passenger that may have left an item within AV 302. In some aspects, data center 350 may send a message to the wireless device associated with the passenger to arrange for return of the misplaced item.

At step 418, the process 400 may determine and process any applicable customer credit, incentive, and/or fee. In one example, a credit or incentive may be provided to a passenger that submits cleanliness data. In another example, a credit or incentive may be provided to a passenger that experiences a delay in waiting for a ride from a second AV due to a cleanliness issue present in the first AV that arrives at a pick-up location. In another example, a fee may be assessed to a customer that is responsible for the cleanliness issue. For instance, a fee may be assessed when it is determined that a customer spilled a soft drink that caused a stain within the AV. In some cases, customers that cause repeated and/or severe damage to an AV may be prohibited from using the AV rideshare services. In some aspects, metadata associated with the cleanliness data (e.g., timestamp, location data, etc.) can be used to identify customers that may be eligible for a customer credit/incentive as well as to identify customers that may owe a fee.

At step 420, the process 400 may include directing the AV to a service facility. For instance, data center 350 may direct AV 302 to AV maintenance facility 360 for cleaning/repair services. As noted above, the selected AV maintenance facility 360 can be based on a remediation plan that is derived from one or more parameters associated with the cleanliness issue.

At step 422, the process 400 can include determining whether the cleanliness issue was resolved. For example, data center 350 may receive feedback (e.g., reports, image data, etc.) from AV maintenance facility 360 after the service is completed. In some cases, data center 350 may use the feedback to determine whether the cleanliness issue has been appropriately resolved. If data center 350 determines that the cleanliness issue is not resolved, data center 350 may determine a revised remediation plan. In some cases, the revised remediation plan may direct the AV to the same or a different AV maintenance facility. For example, the revised remediation plan may direct the AV to a facility that can replace the seat in the AV upon determining that cleaning of the seat was not effective in resolving the cleanliness issue. In some aspects when the issue is resolved, the process 400 may proceed to step 424 in which the process returns to prior processing, which may include repeating the process 400.

Figure 5:
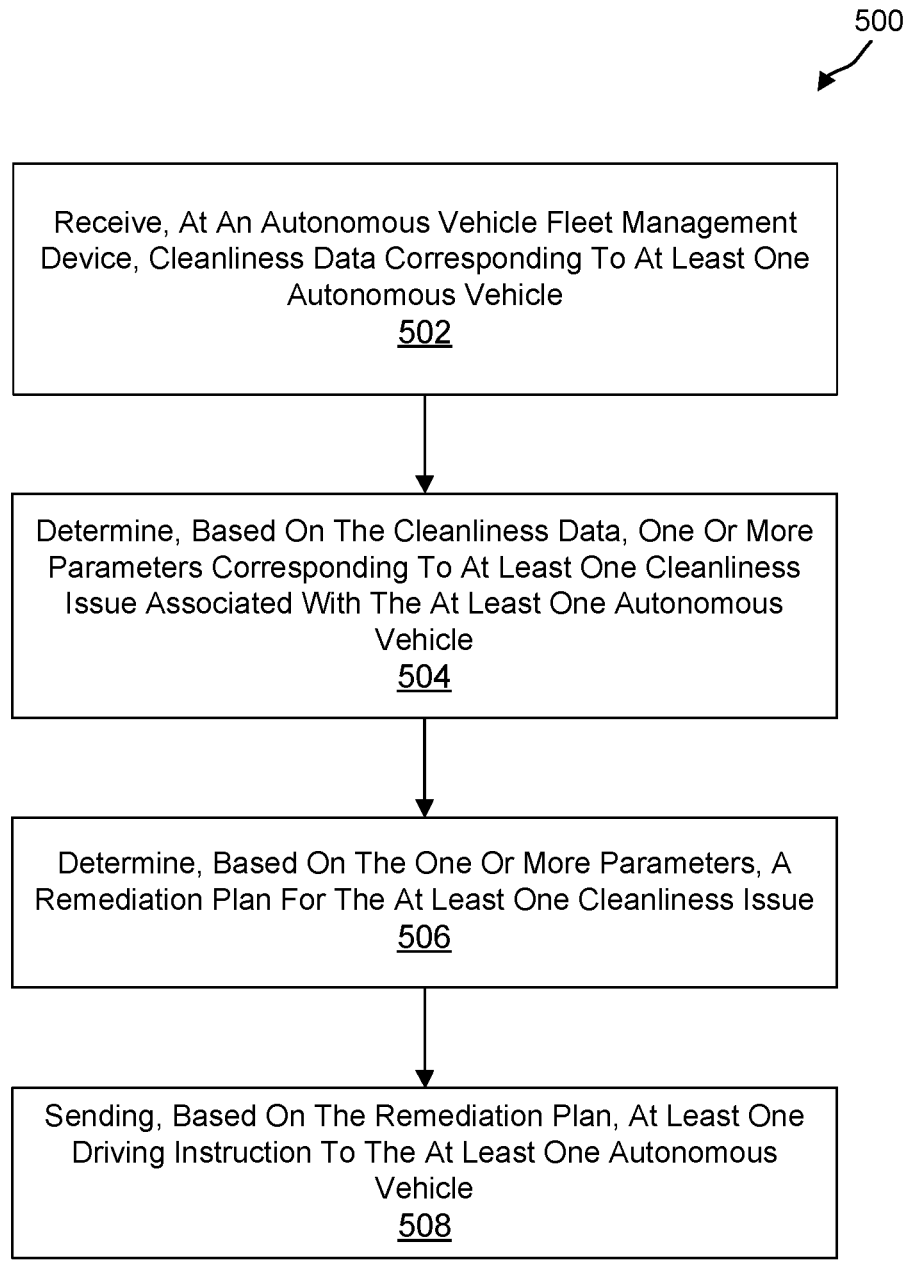
FIG. 5 illustrates another example of a process for monitoring and maintaining cleanliness of an autonomous vehicle, according to some aspects of the present disclosure.

FIG. 5 illustrates another example of a process for monitoring and maintaining cleanliness of an autonomous vehicle. At block 502, the process 500 includes receiving, at an autonomous vehicle fleet management device, cleanliness data corresponding to at least one autonomous vehicle. For example, data center 350 can receive cleanliness data corresponding to AV 302. In some cases, the cleanliness data can be received from a passenger device associated with the at least one autonomous vehicle. For example, the cleanliness data can be received by data center 350 from wireless device 370 (e.g., wireless device 370 is associated with AV 302). In some aspects, the cleanliness data can include sensor data from one or more sensors located within the at least one autonomous vehicle. For instance, the cleanliness data can include sensor data from sensors 304 within AV 302.

At block 504, the process 500 includes determining, based on the cleanliness data, one or more parameters corresponding to at least one cleanliness issue associated with the at least one autonomous vehicle. For example, data center 350 can determine one or more parameters corresponding to cleanliness issue 310 and/or cleanliness issue 312.

In some examples, the one or more parameters corresponding to the at least one cleanliness issue may include at least one of a cleanliness issue type, a cleanliness issue location, and a cleanliness issue severity.

At block 506, the process 500 includes determining, based on the one or more parameters, a remediation plan for the at least one cleanliness issue. For example, data center 350 can determine a remediation plan for cleanliness issue 310 and/or cleanliness issue 312. In some embodiments, the remediation plan can include a type of service, a service provider, a cost of service, a timetable or schedule for service, etc.

At block 508, the process 500 includes sending, based on the remediation plan, at least one driving instruction to the at least one autonomous vehicle. In some aspects, the at least one driving instruction directs the at least one autonomous vehicle to a maintenance facility. For instance, data center 350 can send a driving instruction to AV 302 that instructs AV 302 to drive to AV maintenance facility 360. In some aspects, the process 500 can include transmitting the remediation plan to the maintenance facility. For example, data center 350 can transmit the remediation plan to AV maintenance facility 360.

In some cases, the process 500 can include detecting a trigger for requesting the cleanliness data, wherein the trigger includes at least one of a pick-up location, a drop-off location, a travel route, a time of day, an elapsed time of service, a cleaning schedule, a number of passengers, a type of goods, an animal presence, a ride start, a ride end, and a weather condition. For example, data center 350 may detect a trigger condition for requesting cleanliness data from AV 302 and/or from passenger 308 (e.g., using wireless device 370).

In some examples, the process 500 can include sending a request for the cleanliness data to a passenger device associated with the at least one autonomous vehicle, wherein the cleanliness data includes at least one of image data, video data, audio data, and text data. For instance, data center 350 may send a request to wireless device 370 for cleanliness data that includes image data, video data, audio data, and/or text data. In some aspects, the process 500 can include determining, based on a pose of the image data, a location of the at least one cleanliness issue. For example, data center 350 may use the pose of image data received from wireless device 370 to determine the location of cleanliness issue 310.

Figure 6:
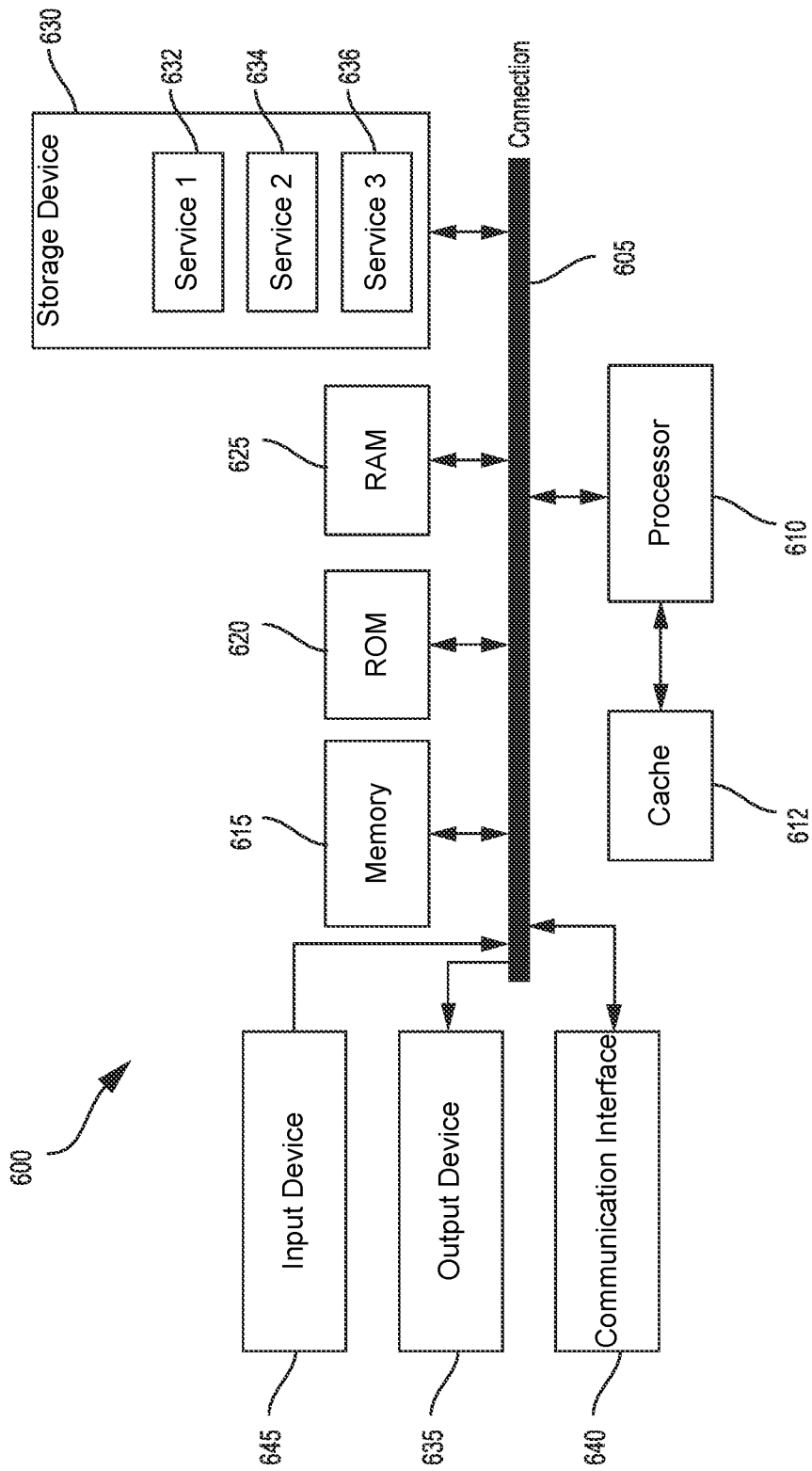
FIG. 6 illustrates an example processor-based system with which some aspects of the subject technology can be implemented, according to some aspects of the present disclosure.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (P C s), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Illustrative examples of the disclosure include:

Aspect 1. A method comprising: receiving, at an autonomous vehicle fleet management device, cleanliness data corresponding to at least one autonomous vehicle; determining, based on the cleanliness data, one or more parameters corresponding to at least one cleanliness issue associated with the at least one autonomous vehicle; determining, based on the one or more parameters, a remediation plan for the at least one cleanliness issue; and sending, based on the remediation plan, at least one driving instruction to the at least one autonomous vehicle.

Aspect 2. The method of Aspect 1, wherein the cleanliness data is received from a passenger device associated with the at least one autonomous vehicle.

Aspect 3. The method of any of Aspects 1 to 2, wherein the cleanliness data includes at least one of image data, video data, audio data, and text data.

Aspect 4. The method of Aspect 3, further comprising: determining, based on a pose of the image data, a location of the at least one cleanliness issue.

Aspect 5. The method of any of Aspects 1 to 4, further comprising: sending a request for the cleanliness data to a passenger device associated with the at least one autonomous vehicle.

Aspect 6. The method of any of Aspects 1 to 5, further comprising: detecting a trigger for requesting the cleanliness data, wherein the trigger includes at least one of a pick-up location, a drop-off location, a travel route, a time of day, an elapsed time of service, a cleaning schedule, a number of passengers, a type of goods, an animal presence, a ride start, a ride end, and a weather condition.

Aspect 7. The method of any of Aspects 1 to 6, wherein the cleanliness data includes sensor data from one or more sensors located within the at least one autonomous vehicle.

Aspect 8. The method of any of Aspects 1 to 7, wherein the one or more parameters corresponding to the at least one cleanliness issue include at least one of a cleanliness issue type, a cleanliness issue location, and a cleanliness issue severity.

Aspect 9. The method of any of Aspects 1 to 8, wherein the at least one driving instruction directs the at least one autonomous vehicle to a maintenance facility.

Aspect 10. The method of Aspect 9, further comprising: transmitting the remediation plan to the maintenance facility.

Aspect 11: An apparatus comprising: at least one memory; and at least one processor coupled to the at least one memory, wherein the at least one processor is configured to perform operations in accordance with any one of Aspects 1 to 10.

Aspect 12: An apparatus comprising means for performing operations in accordance with any one of Aspects 1 to 10.

Aspect 13: A non-transitory computer-readable medium comprising instructions that, when executed by an apparatus, cause the apparatus to perform operations in accordance with any one of Aspects 1 to 10.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
receiving, at an autonomous vehicle fleet management device, cleanliness data corresponding to at least one autonomous vehicle;
determining, based on the cleanliness data, one or more parameters corresponding to at least one cleanliness issue associated with the at least one autonomous vehicle, wherein the one or more parameters includes a cleanliness issue type, a cleanliness issue location, and a cleanliness issue severity;
determining, based on the one or more parameters, a remediation plan for the at least one cleanliness issue, wherein the remediation plan includes an appropriate service facility from a plurality of service facilities for routing the at least one autonomous vehicle and a timeframe for performing service on the at least one autonomous vehicle, which indicates a time period during which the remediation plan is to commence for the at least one cleanliness issue, based on the cleanliness issue type, the cleanliness issue location, and the cleanliness issue severity;
sending, based on the remediation plan, at least one driving instruction to the at least one autonomous vehicle, which causes the autonomous vehicle to begin maneuvering to the service facility within the timeframe;

detecting a trigger for requesting the cleanliness data from a passenger device associated with the at least one autonomous vehicle, wherein the trigger is based on at least one of a pick-up location, a drop-off location, a travel route, a time of day, a number of passengers, a type of goods, an animal presence, and a weather condition; and sending, in response to detecting the trigger, a request for the cleanliness data to the passenger device associated with the at least one autonomous vehicle, wherein the cleanliness data is received from the passenger device associated with the at least one autonomous vehicle, wherein the cleanliness data includes at least one of image data and video data from a camera of the passenger device.

2. The method of claim 1, further comprising:

determining, based on a pose of the image data, a location of the at least one cleanliness issue.

3. An apparatus comprising:

at least one memory comprising instructions; and at least one processor configured to execute the instructions and cause the apparatus to:
receive cleanliness data corresponding to at least one autonomous vehicle;
determine based on the cleanliness data, one or more parameters corresponding to at least one cleanliness issue associated with the at least one autonomous vehicle, wherein the one or more parameters includes a cleanliness issue type, a cleanliness issue location, and a cleanliness issue severity;
determine, based on the one or more parameters, a remediation plan for the at least one cleanliness issue, wherein the remediation plan includes an appropriate service facility from a plurality of service facilities for routing the at least one autonomous vehicle and a timeframe for performing service on the at least one autonomous vehicle, which indicates a time period during which the remediation plan is to commence for the at least one cleanliness issue, based on the cleanliness issue type, the cleanliness issue location, and the cleanliness issue severity;
send, based on the remediation plan, at least one driving instruction to the at least one autonomous vehicle, which causes the autonomous vehicle to begin maneuvering to the service facility within the timeframe;
detect a trigger for requesting the cleanliness data from a passenger device associated with the at least one autonomous vehicle, wherein the trigger is based on at least one of a pick-up location, a drop-off location, a travel route, a time of day, a number of passengers, a type of goods, an animal presence, and a weather condition; and
send, in response to detecting the trigger, a request for the cleanliness data to the passenger device associated with the at least one autonomous vehicle,
wherein the cleanliness data is received from the passenger device associated with the at least one autonomous vehicle, wherein the cleanliness data includes at least one of image data and video data from a camera of the passenger device.

4. The apparatus of claim 3, wherein the at least one processor is further configured to cause the apparatus to:
determine, based on a pose of the image data, a location of the at least one cleanliness issue.

5. A non-transitory computer-readable storage medium having stored thereon instructions which, when executed by one or more processors, cause the one or more processors to:
receive cleanliness data corresponding to at least one autonomous vehicle;
determine based on the cleanliness data, one or more parameters corresponding to at least one cleanliness issue associated with the at least one autonomous vehicle, wherein the one or more parameters includes a cleanliness issue type, a cleanliness issue location, and a cleanliness issue severity;
determine, based on the one or more parameters, a remediation plan for the at least one cleanliness issue, wherein the remediation plan includes an appropriate service facility from a plurality of service facilities for routing the at least one autonomous vehicle and a timeframe for performing service on the at least one autonomous vehicle, which indicates a time period during which the remediation plan is to commence for the at least one cleanliness issue, based on the cleanliness issue type, the cleanliness issue location, and the cleanliness issue severity;
send, based on the remediation plan, at least one driving instruction to the at least one autonomous vehicle, which causes the autonomous vehicle to begin maneuvering to the service facility within the timeframe;
detect a trigger for requesting the cleanliness data from a passenger device associated with the at least one autonomous vehicle, wherein the trigger is based on at least one of a pick-up location, a drop-off location, a travel route, a time of day, a number of passengers, a type of goods, an animal presence, and a weather condition; and
send, in response to detecting the trigger, a request for the cleanliness data to the passenger device associated with the at least one autonomous vehicle,
wherein the cleanliness data is received from the passenger device associated with the at least one autonomous vehicle, wherein the cleanliness data includes at least one of image data and video data from a camera of the passenger device.

6. The method of claim 1, wherein the cleanliness issue severity is determined based on the cleanliness issue type, the cleanliness issue location within the at least one autonomous vehicle, and a cleanliness issue size.

7. The apparatus of claim 3, wherein the cleanliness issue severity is determined based on the cleanliness issue type, the cleanliness issue location within the at least one autonomous vehicle, and a cleanliness issue size.

8. The non-transitory computer-readable storage medium of claim 5, wherein the cleanliness issue severity is determined based on the cleanliness issue type, the cleanliness issue location within the at least one autonomous vehicle, and a cleanliness issue size.

* * * * *